United States Patent
Gu

(10) Patent No.: US 11,397,779 B2
(45) Date of Patent: Jul. 26, 2022

(54) METHOD AND DEVICE FOR PUSHING INFORMATION BASED ON SEARCH CONTENT

(71) Applicant: BEIJING SANKUAI ONLINE TECHNOLOGY CO., LTD, Beijing (CN)

(72) Inventor: Hao Gu, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 733 days.

(21) Appl. No.: 16/312,662

(22) PCT Filed: Jun. 23, 2016

(86) PCT No.: PCT/CN2016/086889
§ 371 (c)(1),
(2) Date: Dec. 21, 2018

(87) PCT Pub. No.: WO2017/219317
PCT Pub. Date: Dec. 28, 2017

(65) Prior Publication Data
US 2019/0258684 A1 Aug. 22, 2019

(51) Int. Cl.
*G06F 16/00* (2019.01)
*G06F 16/951* (2019.01)
(Continued)

(52) U.S. Cl.
CPC ............ *G06F 16/951* (2019.01); *G06F 16/00* (2019.01); *G06F 16/24578* (2019.01); *G06F 16/9532* (2019.01); *G06F 16/9535* (2019.01)

(58) Field of Classification Search
CPC .. G06F 16/00; G06F 16/24578; G06F 16/951; G06F 16/9532; G06F 16/9535
See application file for complete search history.

(56) References Cited

U.S. PATENT DOCUMENTS

| 6,711,589 B2 | 3/2004 | Dietz |
| 2004/0039733 A1 | 2/2004 | Soulanille |

(Continued)

FOREIGN PATENT DOCUMENTS

| CN | 1462003 | 12/2003 |
| CN | 1679025 | 10/2005 |

(Continued)

OTHER PUBLICATIONS

International Search Report in International Patent Application No. PCT/CN2016/086889, dated Mar. 10, 2017.
(Continued)

*Primary Examiner* — Dinku W Gebresenbet
(74) *Attorney, Agent, or Firm* — Greenblum & Bernstein, P.L.C.

(57) ABSTRACT

A method of pushing information based on search content is provided, which belongs to the field of computer technology and solves a problem of incorrect search results. The method includes: dividing search result display slots into a plurality of slot blocks in a front-to-back order; presetting an admission condition for each of the slot blocks; determining a current to-be-filled slot based on the front-to-back order of the search result display slots; selecting a search result satisfying a preset condition from an organic search queue and push information satisfying an admission condition of a current slot block in a push information search queue and placing the selected search result into the current to-be-filled slot, where the current to-be-filled slot is located within the current slot block. The method of pushing information disclosed by the present disclosure ensures the accuracy of search results and improves user experience at the same time.

12 Claims, 6 Drawing Sheets

(51) Int. Cl.
  *G06F 16/9532* (2019.01)
  *G06F 16/9535* (2019.01)
  *G06F 16/2457* (2019.01)

(56) References Cited

U.S. PATENT DOCUMENTS

| | | | |
|---|---|---|---|
| 2009/0240600 | A1 | 9/2009 | Soulanille |
| 2013/0117312 | A1* | 5/2013 | Chen .................. G06F 16/2468 707/780 |
| 2015/0317697 | A1* | 11/2015 | Samet .................... G06Q 30/08 705/14.43 |
| 2016/0063117 | A1* | 3/2016 | Carter ............... G06F 16/24522 707/727 |
| 2017/0061515 | A1* | 3/2017 | Hummel ............... G06F 16/248 |

FOREIGN PATENT DOCUMENTS

| | | |
|---|---|---|
| CN | 103984757 | 8/2014 |
| CN | 104063523 | 9/2014 |
| WO | 2015/176624 | 11/2015 |

OTHER PUBLICATIONS

Canadian Intellectual Property Office, Office Action Issued in Application No. 3062986, dated Jul. 30, 2021, 5 pages.
Canada Patent Office, Office Action Issued in Application No. 3062986, dated Jan. 7, 2022, 4 pages.

* cited by examiner

METHOD AND DEVICE FOR PUSHING INFORMATION BASED ON SEARCH CONTENT

TECHNICAL FIELD

The present disclosure relates to the field of computer technology, and in particular, to a method and a device for pushing information based on search content.

BACKGROUND

With the development of Internet technology, more and more users use search engines. Thus, more and more enterprises push information, such as advertising information and website links, through the search engines. In the prior art, two common methods of pushing information based on search content include: pushing information with a fixed position and pushing information with a floating position. For pushing information with a fixed position, organic search results and push information search results of a search word are respectively ranked, and then, push information is inserted into a fixed position of an organic search result sequence. For pushing information with a floating position, the organic search results of the search word are mixedly ranked according to an index such as relevance, where organic search results include push information search results; then, the commercial value is added to the push information search results by using a weight coefficient, and then the organic search results are re-ranked, where the weight coefficient directly affects the ranking position of push information.

It can be seen that the methods of pushing information in the prior art at least include the following deficiencies: push information appears in a fixed position of search results or appears in a large volume during a particular period due to the impact of the weight coefficient of the commercial value, which results in that the search results and the search word are not matched in relevance, and is intuitively expressed as incorrect search results.

SUMMARY

The present disclosure provides a method of pushing information based on search content, which solves the problems that push information appears in a fixed position of search results or appears in a large volume during a particular period due to the impact of the weight coefficient of the commercial value. Which results in that the search results and the search word are not matched in relevance, and is intuitively expressed as incorrect search results in the prior art.

To solve the above problems, examples of the present disclosure provide a method of pushing information based on search content, including: dividing search result display slots into a plurality of slot blocks in a front-to-back order; presetting an admission condition for each of the slot blocks; determining a current to-be-filled slot based on the front-to-back order of the search result display slots; selecting a search result satisfying a preset condition from an organic search queue and push information, where the push information satisfies an admission condition of a current slot block in a push information search queue; and placing the selected search result into the current to-be-filled slot, where the current to-be-filled slot is located within the current slot block. Correspondingly, examples of the present disclosure further provides an apparatus for pushing information based on search content, including:

a block setting module, configured to divide search result display slots into a plurality of slot blocks in a front-to-back order and preset an admission condition for each of the slot blocks;

a slot selecting module, configured to determine a current to-be-filled slot based on the front-to-back order of the search result display slots; and a slot filling module, configured to select a search result satisfying a preset condition from an organic search queue and push information, and place the selected search result into the current to-be-filled slot, where the push information satisfies an admission condition of a current slot block in a push information search queue;

where the current to-be-filled slot is located within the current slot block. According to the method of pushing information in the present disclosure, the search result display slots are divided into a plurality of slot blocks in a front-to-back order and the admission condition for each of the slot blocks is preset; a current to-be-filled slot is determined based on the front-to-back order of the search result display slots; and a search result satisfying the preset condition is selected from an organic search queue and the push information, and placed into the current to-be-filled slot, where the push information satisfies the admission condition of the current slot block in a push information search queue, and the current to-be-filled slot is located within the current slot block. Thus, the method solves the problems that push information appears in a fixed position of search results or appears in a large volume during a particular period due to the impact of the weight coefficient of the commercial value, which results in that the search results and the search word are not matched in relevance, and is intuitively expressed as incorrect search results in the prior art. The method of pushing information disclosed by the present disclosure ensures the accuracy of search results and improves user experience at the same time.

BRIEF DESCRIPTION OF THE DRAWINGS

To describe the technical solutions in examples of the present disclosure more clearly, drawings required in descriptions of the examples of the present disclosure or the prior art will be briefly introduced below. It is apparent that the drawings described below are merely some examples of the present disclosure and other drawings may be obtained by those of ordinary skill in the art based on these drawings in the examples of the present disclosure without paying creative work.

DETAILED DESCRIPTION OF THE EMBODIMENTS

The technical solutions of examples of the present disclosure will be described clearly and fully below in combination with drawings in examples of the present disclosure. Apparently, the described examples are merely part of examples of the present disclosure rather than all examples. Other examples obtained by those of ordinary skill in the art based on the examples in the present disclosure without paying creative work shall all fall into the scope of protection of the present disclosure.

Information may be pushed in many manners, including: a case that after a search word input by the user is received, the searched relevant information is pushed to a user; and a case that without receiving any trigger from the user, information is actively sent to a user. The present disclosure is applicable to the case of pushing relevant information after a search word input by a user is received. The information pushed in the present disclosure may include a website link, a notice, an advertisement and the like, which are not limited herein.

Search results in examples of the present disclosure refer to organic search results and include a plurality of pieces of information. Push information is part of the organic search results. An organic search service refers to a program module or hardware for implementing an organic search in a search engine, which is configured to obtain a matching page that is most relevant to a search word in the search engine. Searched objects in examples of the present disclosure are uniformly referred to as "materials", including a website, different webpage contents and the like, such as business information on a website, product introduction, an article, a picture, and a website address. In examples of the present disclosure, some materials are assigned with a "push information" attribute to indicate that the materials belong to push information.

Figure 1:
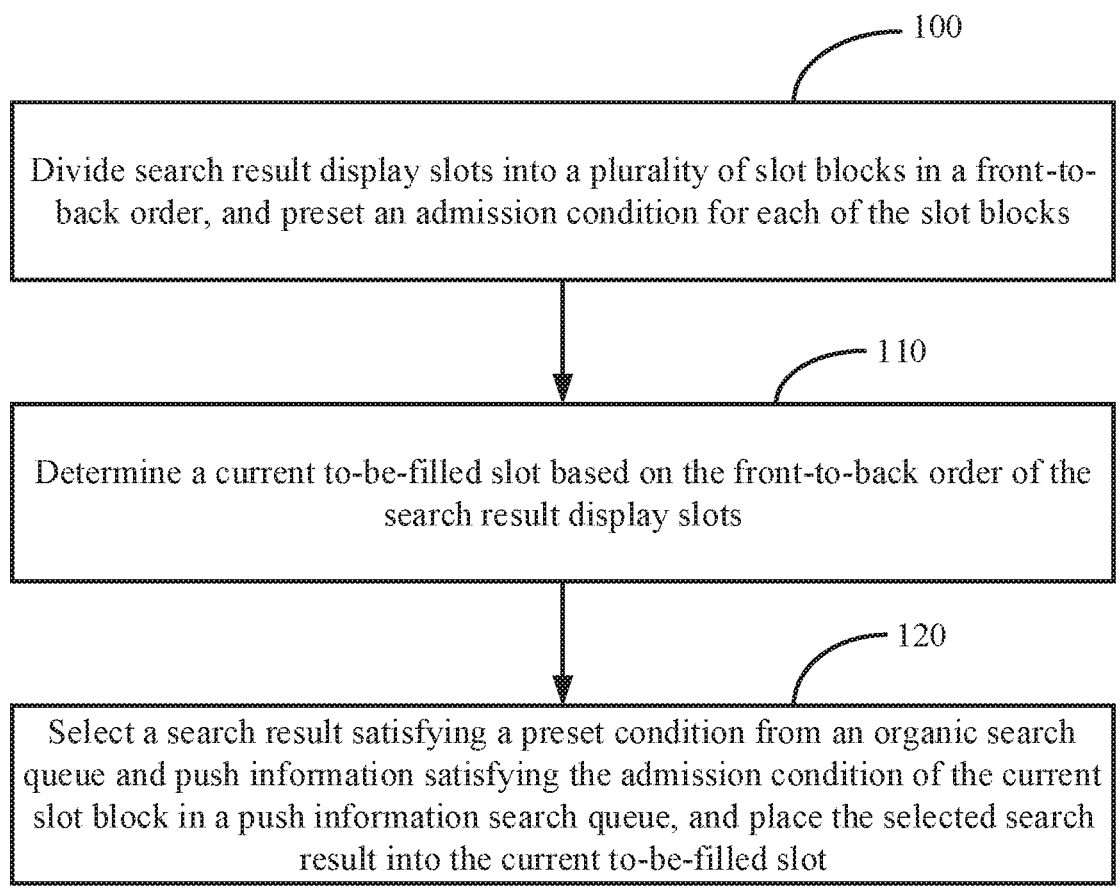
FIG. 1 is a flowchart illustrating a method of pushing information according to an example of the present disclosure.

The present disclosure discloses a method of pushing information based on search content. As shown in FIG. 1, the method includes steps 100 to 130.

At step 100, search result display slots are divided into a plurality of slot blocks in a front-to-back order; and an admission condition for each of the slot blocks is preset.

The search result display slot corresponds to a position of a search result displayed on a search result display page, for example, a position of a search result displayed on a page of a browser. In a specific implementation, a server is usually pre-provided with N search result display slots to sequentially place search results for display on a client such as a browser. A first search result on a search result display page of a client, such as a browser, is placed into a first search result display slot, where N is a positive integer greater than 1. The number of the search result display slots may also be dynamically set according to the number of organic search results obtained by a search server, which is not limited herein.

In a specific implementation, the search result display slots are divided into M slot blocks in the front-to-back order, where M is a positive integer greater than 1 and less than N. The number of display slots in each slot block may be same or different, which is set according to actual display results. For example, N is equal to 100 and M is equal to 4. The display slots from the 1st display slot to the 15th display slot are divided into a first slot block; the display slots from the 16th display slot to the 30th display slot are divided into a second slot block; the display slots from the 31st display slot to the 60th display slot are divided into a third slot block; and the 61st display slot and subsequent display slots are divided into a fourth slot block. In a specific implementation, for convenience of use, the slot blocks obtained by division are numbered, for example, as 1, 2, 3 and 4.

Then, an admission condition of push information for each slot block is preset. Generally, presetting the admission condition for each slot block includes: setting a strong-to-weak admission condition for the slot blocks in the front-to-back order. That is, the admission condition of a slot block at which display slots are located and ranked in the front is stricter, and the admission condition of a slot block at which display slots are located and ranked in the back is laxer. For example, the admission condition of the slot block 1 is stronger than the admission condition of the slot block 2. The admission condition refers to a condition that needs to be satisfied when the push information is placed into the slot block. The admission condition includes any one or more of relevance, a click-through rate and a conversion rate.

In a specific implementation, for each of the slot blocks, an admission condition of push information for the slot block may be calculated offline. In a method of presetting the admission condition of push information for each slot block, presetting the admission condition for each slot block includes: obtaining historical data of all search results placed within the slot block; calculating a value of each admission parameter when the search results are placed into the slot block according to the obtained historical data; setting the obtained value of each admission parameter as each admission parameter threshold of the slot block, where the admission parameter includes any one or more of average relevance, an average click-through rate and an average conversion rate; and setting the admission condition of the slot block to that a value of each of admission parameters is greater than the set admission parameter threshold. The admission parameters including average relevance, an average click-through rate and an average conversion rate are taken as an example. Firstly, the average relevance, the average click-through rate and the average conversion rate of all search results in a slot block are calculated; then, a numerical value of the calculated average relevance is set as an average relevance threshold, a numerical value of the average click-through rate is set as an average click-through rate threshold, and a numerical value of the average conversion rate is set as an average conversion rate threshold; finally, the admission condition of the push information for the slot block is set to that: a pre-estimated relevance is greater than the set average relevance threshold, a pre-estimated click-through rate is greater than the set average click-through rate threshold, and a pre-estimated conversion rate is greater than the set average conversion rate threshold.

In a specific implementation, quality marking may be manually performed for a push information sample. A quality measure value is obtained by a binary classification model and set as a quality threshold of each slot block, and the admission condition of each slot block is determined as that: the quality measure value obtained by the binary classification model is greater than the set quality threshold. In a typical implementation, a push information sample is manually marked. For example, the push information sample is manually marked as follows: 1 refers to that the quality satisfies the requirement of the first slot block (a positive sample), and 0 refers to that the quality does not satisfy the requirement of the first slot block (a negative sample). The marked push information is taken as a training sample. One or more admission parameters of the relevance, the click-through rate, the conversion rate and the like are taken as features to construct the binary classification model, so as to obtain a weight of each feature of the classification model. That is, the weight of each admission parameter is obtained. Thus, a process of constructing the binary classification model of each slot block is completed. The quality measure value of the push information may be obtained by identifying the push information based on the binary classification model.

At step 110, a current to-be-filled slot is determined based on the front-to-back order of the search result display slots.

The search result display slots are usually filled in the front-to-back order, that is, a first display slot in the first slot block is firstly filled, and a second display slot in the first slot block is then filled until all display slots in the first slot block are filled. Then, all display slots in the second slot block are filled in the same order and so on until all display slots in all slot blocks are filled, or all search results are already placed into the display slots.

At step 120, a search result satisfying a preset condition is selected from an organic search queue and push information satisfying the admission condition of the current slot block in a push information search queue, and placed into the current to-be-filled slot.

The current to-be-filled slot is located within the current slot block.

Figure 2:
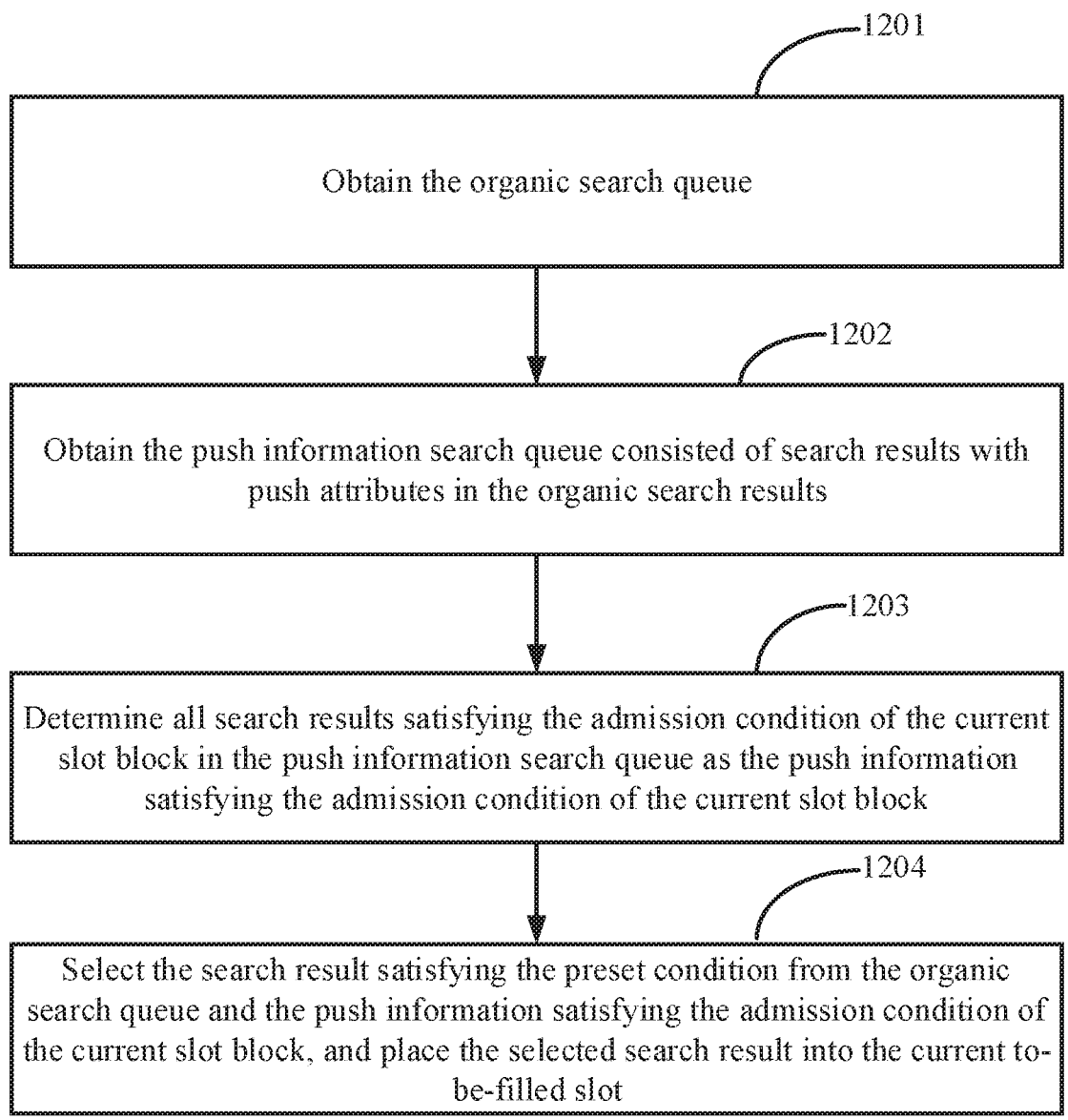
FIG. 2 is a specific flowchart illustrating the step of placing a search result in the method of pushing information according to an example of the present disclosure.

In a specific implementation, as shown in FIG. 2, the step of selecting the search result satisfying the preset condition from the organic search queue and the push information satisfying the admission condition of the current slot block in the push information search queue and placing the selected search result into the current to-be-filled slot further includes steps 1201-1204.

At step 1201, the organic search queue is obtained.

In a specific implementation, after a search word is received from a user, an organic search service performs matching for organic search materials in a database, and places the materials satisfying a condition into the organic search queue. Preferably, the organic search service calculates a first evaluation score for each material and selects a first preset number of materials with high first evaluation scores in a descending order of the first evaluation scores to form the organic search queue. Search results in the organic search queue are ranked in the descending order of the first evaluation scores. The first evaluation score is used to indicate a user value, and the higher first evaluation score indicates the higher user value. In a specific implementation, the first evaluation score may be calculated according to a formula ActionValue×pCTR. Preferably, pCTR is obtained through a click-through rate pre-estimation model. In a specific implementation, firstly, positive and negative samples are constructed based on user actions to train parameters of the click-through rate pre-estimation model; then, a probability pCTR that a user clicks on one result is pre-estimated by using the trained click-through rate pre-estimation model.

ActionValue indicates a value generated by different actions on a landing page (for example, a page displaying detailed information/merchandises/services in a browser/client) after a user clicks. In a specific implementation, the ActionValue of a click result for a user may be calculated by multiplying a clicked conversion rate by a Gross Merchandise Volume (GMV). Where the clicked conversion rate is obtained through a pre-trained classification model. Similar to training the click-through rate pre-estimation model, the conversion pre-estimation model generally uses deal information clicks as positive examples and non-deal information clicks as negative samples to obtain training data. A parameter file of the conversion pre-estimation model is obtained by learning from the training data based on a mainstream classification algorithm such as SVM/GBDT, and then, the conversion rate is pre-estimated by using the trained conversion pre-estimation model.

At step 1202; the push information search queue consisted of search results with push attributes in the organic search results is obtained.

In a content-based search, organic search materials include push information materials with push attributes. In a specific implementation, search results with push attributes may be selected from the organic search results and placed into the push information search queue; or the search results with push attributes may be selected from the organic search results, placed into the push information search queue, and deleted from the organic search queue. The search results in the push information search queue are ranked in a descending order of second evaluation scores. The second evaluation score is used to indicate a sum of the user value and the platform revenue, and the higher second evaluation score indicates the higher sum of the user value and the platform revenue. In a specific implementation, the second evaluation score of the search result in the push information search queue is calculated according to a formula (BidValue+ActionValue)×pCTR. The push information search queue is consisted of information with push attributes in the organic search results. Therefore, the ActionValue in the formula for calculating the second evaluation score is calculated in the same manner as the ActionValue in the formula for calculating the first evaluation score is calculated; the pCTR is also obtained by invoking the click-through rate pre-estimation model and is equal to the pCTR of the organic search result. BidValue in the formula for calculating the second evaluation score refers to determination of click value for one push information, which is explicitly input through an advertisement service platform or an information pushing platform.

At step 1203, all search results satisfying the admission condition of the current slot block in the push information search queue are determined as the push information satisfying the admission condition of the current slot block.

All push information satisfying the preset admission condition of the current slot block is obtained by sequentially determining whether all push information in the push information search queue satisfies the preset admission condition of the current slot block.

In a specific implementation, if the preset admission condition of the current slot block is that the pre-estimated relevance is greater than the set average relevance threshold, the pre-estimated click-through rate is greater than the set average click-through rate threshold, and the pre-estimated conversion rate is greater than the set average conversion rate threshold, it is desired to calculate the relevance, the click-through rate and the conversion rate of each piece of push information relative to the current slot block, and compare the calculated numerical values with the preset thresholds. When the calculated relevance is greater than the set average relevance threshold, the calculated click-through rate is greater than the set average click-through rate threshold, and the calculated conversion rate is greater than the set average conversion rate threshold, the push information is determined as push information satisfying the admission condition of the current slot block. The specific method of calculating the relevance, the click-through rate and the conversion rate of each piece of push information may be performed based on the prior art, which will not be described herein.

If the preset admission condition of the current slot block is the quality measure value obtained through the binary classification model greater than the set quality threshold, it is desired to classify each piece of the push information in the push information search queue with the pre-constructed binary classification model, so as to obtain a probability that the push information output by the binary classification model is a positive sample, that is, to obtain the quality measure value of the push information. Then, the quality measure value of each piece of the push information is compared with the preset quality threshold. It is determined that the push information satisfies the admission condition of the current slot block when the obtained quality measure value is equal to or greater than the quality threshold.

At step 1204, the search result satisfying the preset condition is selected from the organic search queue and the push information satisfying the admission condition of the current slot block and placed into the current to-be-filled slot.

According to the present disclosure, the search result display slots are filled in a manner of pre-scheduled pairwise per-slot auction. That is, for each display slot in each slot block, a search result with the highest first evaluation score in the organic search queue and a search result with the highest second evaluation score in the push information satisfying the admission condition of the slot block within which the current to-be-filled slot is located compete against each other for the current to-be-filled slot. The step of selecting the search result satisfying the preset condition from the organic search queue and the push information satisfying the admission condition of the current slot block and placing the selected search result into the current to-be-filled slot further includes sub-step S1 and sub-step S2.

At sub-step S1, the search result with the highest first evaluation score in the organic search queue is taken as a first alternative search result, and the search result with the highest second evaluation score in the push information satisfying the admission condition of the current slot block is taken as a second alternative search result.

The search result with the highest first evaluation score in the organic search queue is taken as the first alternative search result, and the search result with the highest second evaluation score in the push information satisfying the admission condition of the current slot block is taken as the second alternative search result; then, the second alternative search result and the first alternative search result compete against each other for the current to-be-filled slot.

At sub-step S2, the search result satisfying the preset condition is selected from the first alternative search result and the second alternative search result and placed into the current to-be-filled slot.

In a specific implementation, the step of selecting the search result satisfying the preset condition from the first alternative search result and the second alternative search result and placing the selected search result into the current to-be-filled slot may include sub-step S21 and sub-step S23.

At sub-step S21, a user value loss and a platform revenue of placing the second alternative search result into the current to-be-filled slot relative to placing the first alternative search result into the current to-be-filled slat are pre-estimated.

In a specific implementation, the user value loss may be a user value loss ratio, a user value loss difference or a value obtained by performing conversion based on the user value loss ratio. The platform revenue may be a platform revenue coefficient, a platform revenue difference or a value obtained by performing conversion based on the platform revenue coefficient. Preferably, the user value loss is the user value loss ratio, and the platform revenue is the platform revenue coefficient.

The step of pre-estimating the user value loss and the platform revenue coefficient of placing the second alternative search result into the current to-be-filled slot relative to placing the first alternative search result into the current to-be-filled slot includes:

calculating the user value loss ratio of placing the second alternative search result into the current to-be-filled slot relative to placing the first alternative search result into the current to-be-filled slot according to a formula (ActionValue$_{AD}$×pCTR$_{AD}$)/(ActionValue$_{ORG}$×pCTR$_{ORG}$); and calculating the platform revenue coefficient of placing the second alternative search result into the current to-be-filled slot relative to placing the first alternative search result into the current to-be-filled slot according to a formula (BidValue$_{AD}$+ActionValue$_{AD}$)×pCTR$_{AD}$/(ActionValue$_{ORG}$×pCTR$_{ORG}$);

where, BidValue$_{AD}$ refers to a preset click value of the second alternative search result; ActionValue$_{AD}$ refers to a value generated by different actions on a landing page after the user clicks on the second alternative search result; pCTR$_{AD}$ refers to a pre-estimated click-through rate of placing the second alternative search result into the current to-be-filled slot; ActionValue$_{ORG}$ refers to a value generated by different actions on a landing page after the user clicks on the first alternative search result; and pCTR$_{ORG}$ refers to a pre-estimated click-through rate of placing the first alternative search result into the current to-be-filled slot.

In a specific implementation, when the push information is an advertisement, BidValue$_{AD}$, may refer to an advertiser bid which is input through an advertisement platform or a search platform. pCTR$_{AD}$ and pCTR$_{ORG}$ refer to pre-estimated click-through rates, and ActionValue$_{AD}$ and ActionValue$_{ORG}$ may be obtained by multiplying the clicked conversion rate by the Gross Merchandise Volume (GMV), where the clicked conversion rate is obtained through a pre-constructed conversion pre-estimation model. A specific method of constructing the click-through rate pre-estimation model and a specific method of calculating the click-through rate based on the click-through rate pre-estimation model are the prior art, which will not be described herein.

At sub-step S23, when the user value loss and the platform revenue satisfy the preset condition, the first alternative search result is placed into the current to-be-filled slot; and otherwise, the second alternative search result is placed into the current to-be-filled slot.

Preferably, the user value loss being the user value loss ratio and the platform revenue being a platform revenue coefficient are taken as an example. When the user value loss and the platform revenue satisfy the preset condition, the first alternative search result is placed into the current to-be-filled slot; and otherwise, the second alternative search result is placed into the current to-be-filled slot. Specifically, when the user value loss ratio and the platform revenue coefficient satisfy the preset condition, the first alternative search result is placed into the current to-be-filled slot; and otherwise, the second alternative search result is placed into the current to-be-filled slot. In a specific implementation, the step of placing the first alternative search result into the current to-be-filled slot when the user value loss ratio and the platform revenue coefficient satisfy the preset condition and placing the second alternative search result into the current to-be-filled slot when the user value loss ratio and the platform revenue coefficient do not satisfy the preset condition may include at least three implementations as follows.

In the first implementation, the preset condition for the current to-be-filled slot is satisfied. The step of placing the first alternative search result into the current to-be-filled slot when the user value loss ratio and the platform revenue coefficient satisfy the preset condition and placing the second alternative search result into the current to-be-filled slot when the user value loss ratio and the platform revenue coefficient do not satisfy the preset condition includes: when a product of the user value loss ratio and the platform revenue coefficient is less than a first threshold, placing the first alternative search result into the current to-be-filled slot; and otherwise, placing the second alternative search result into the current to-be-filled slot.

In the second implementation, the preset condition for the current to-be-filled slot block is satisfied. The step of placing the first alternative search result into the current to-be-filled slot when the user value loss ratio and the platform revenue coefficient satisfy the preset condition and placing the second alternative search result into the current to-be-filled slot when the user value loss ratio and the platform revenue coefficient do not satisfy the preset condition includes: pre-estimating an accumulated user value loss ratio and an accumulated platform revenue coefficient of the current slot block after placing the second alternative search result into the current to-be-filled slot relative to placing the first alternative search result into the current to-be-filled slot; when a product of the accumulated user value loss ratio and the accumulated platform revenue coefficient is less than a second threshold, placing the first alternative search result into the current to-be-filled slot; and otherwise, placing the second alternative search result into the current to-be-filled slot.

In the third implementation, the preset condition for the current to-be-filled slot and the preset condition for the current to-be-filled slot block are both satisfied. The step of placing the first alternative search result into the current to-be-filled slot when the user value loss ratio and the platform revenue coefficient satisfy the preset condition and placing the second alternative search result into the current to-be-filled slot when the user value loss ratio and the platform revenue coefficient do not satisfy the preset condition includes: pre-estimating an accumulated user value loss ratio and an accumulated platform revenue coefficient of the current slot block after placing the second alternative search result into the current to-be-filled slot relative to placing the first alternative search result into the current to-be-filled slot; when the product of the user value loss ratio and the platform revenue coefficient is less than the first threshold and the product of the accumulated user value loss ratio and the accumulated platform revenue coefficient is less than the second threshold, placing the first alternative search result into the current to-be-filled slot; and otherwise, placing the second alternative search result into the current to-be-filled slot. In a specific implementation, after the step of pre-estimating the user value loss ratio and the platform revenue coefficient of placing the second alternative search result into the current to-be-filled slot relative to placing the first alternative search result into the current to-be-filled slot, the method further includes:

At sub-step S22, the user value loss ratio and the platform revenue coefficient corresponding to the current to-be-filled slot are recorded.

The user value loss ratio and the platform revenue coefficient corresponding to the current to-be-filled slot are recorded to facilitate subsequent use.

Pre-estimating the accumulated user value loss ratio and the accumulated platform revenue coefficient of the current slot block after placing the second alternative search result into the current to-be-filled slot relative to placing the first alternative search result into the current to-be-filled slot includes: obtaining a user value loss ratio and a platform revenue coefficient corresponding to all slots up to the current to-be-filled slot in the current slot block respectively; obtaining the accumulated user value loss ratio of the current slot block by accumulating the user value loss ratio corresponding to all of the slots up to the current to-be-filled slot in the current slot block respectively; and obtaining the accumulated platform revenue coefficient of the current slot block by accumulating the platform revenue coefficient corresponding to all of the slots up to the current to-be-filled slot in the current slot block respectively.

In a specific implementation, the current slot block includes, for example, 10 slots (the 1st slot to the 10th slot). It is assumed that search results placed within the 5th slot and the 9th slot are push information, and search results placed within other slots are organic search results. When it is determined whether the second alternative search result (i.e., push information) or the first alternative search result (i.e., a search result in the search result queue) is placed into each slot, it is desired to pre-estimate the user value loss ratio and the platform revenue coefficient of placing the second alternative search result to the current to-be-filled slot relative to placing the first alternative search result into the current to-be-filled slot according to the method at sub-step S21, and record the user value loss ratio and the platform revenue coefficient corresponding to each slot. After it is estimated that an organic search result is placed into the current to-be-filled slot (i.e., the 10th slot), the user value loss ratio $R_{1i}$ and the platform revenue coefficient $R_{2i}$ corresponding to each slot in the first 10 slots in the current slot block are obtained. Then, an accumulated user value loss ratio of the current slot block is obtained by calculating a mathematical average value or a product of 10 user value loss ratios $R_1$, and an accumulated platform revenue coefficient of the current slot block is obtained by calculating a mathematical average value or a product of 10 platform revenue coefficients $R_2$. For example, the accumulated user value loss ratio $R_3$ of the current slot block is calculated according to a formula $$R_3 = \sum_{i=1}^{i=10} R_{1i};$$

and the accumulated platform revenue coefficient $R_4$ of the current slot block is calculated according to a formula $$R_4 = \sum_{i=1}^{i=10} R_{2i}.$$

In a specific implementation, for example, the current slot block includes 10 slots (the 1st slot to the 10th slot), the current to-be-filled slot is the 10th slot, and the user value loss ratio $R_1$ and the platform revenue coefficient $R_2$ of placing the second alternative search result into the current to-be-filled slot relative to placing the first alternative search result into the current to-be-filled slot are estimated respectively at sub-step S21. When the user value loss ratio and the platform revenue coefficient satisfy the preset condition, the first alternative search result is placed into the current to-be-filled slot; and otherwise, the second alternative search result is placed into the current to-be-filled slot, which includes that:

(1) when $R_1 \times R_2$ is less than the first threshold, the first alternative search result is placed into the current to-be-filled slot; and otherwise, the second alternative search result is placed into the current to-be-filled slot;

(2) when $R_3 \times R_1$ is less than a second threshold, the first alternative search result is placed into the current to-be-filled slot; and otherwise, the second alternative search result is placed into the current to-be-filled slot; or (3) when $R_1 \times R_2$ is less than the first threshold and $R_3 \times R_4$ is less than the second threshold, the first alternative search result is placed into the current to-be-filled slot; and otherwise, the second alternative search result is placed into the current to-be-filled slot.

Thus, the process of placing a search result into a search result display slot is completed.

According to the method of pushing information in the present disclosure, search result display slots are divided into a plurality of slot blocks in a front-to-back order and an admission condition for each of the slot blocks is preset; a current to-be-filled slot is determined based on the front-to-back order of the search result display slots; and a search result with a user value and a platform revenue satisfying a preset condition is selected from an organic search queue and push information satisfying the admission condition of the current slot block in a push information search queue and placed into the current to-be-filled slot, where the current to-be filled slot is located within the current slot block. In this way, the method solves the problems that push information appears in a fixed position of search results or appears in a large volume during a particular period due to the impact of the weight coefficient of commercial value, which results in that the search results and the search word are not matched in relevance, and is intuitively expressed as incorrect search results. The method provided by the present disclosure ensures the accuracy of search results and improves user experience at the same time.

Figure 3:
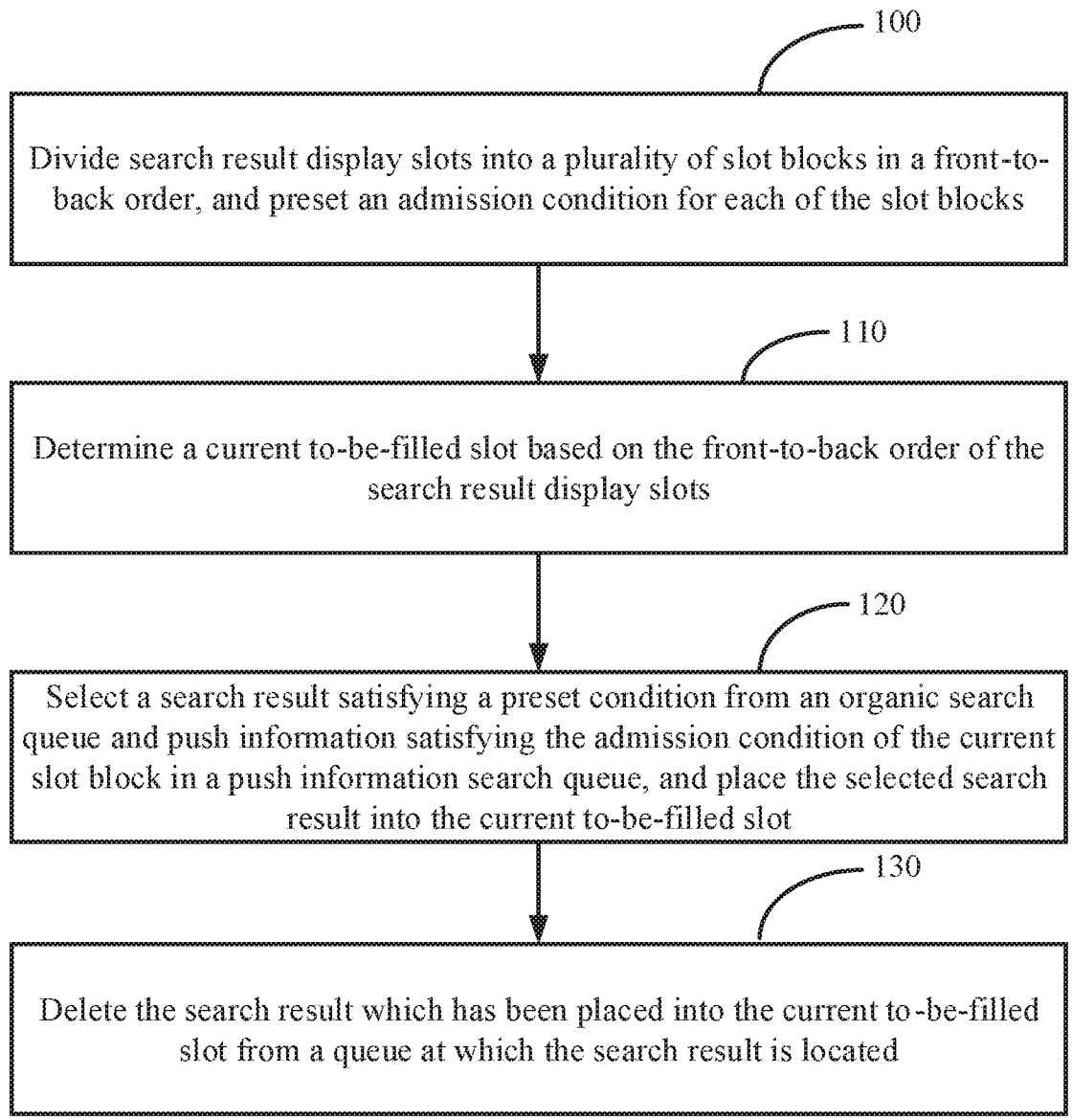
FIG. 3 is a flowchart illustrating a method of pushing information according to another example of the present disclosure.

Preferably, in another example of the present disclosure, as shown in FIG. 3, the method of pushing information also includes the following steps.

At step 130, the search result which has been placed into the current to-be-filled slot is deleted from a queue at which the search result is located.

In a specific implementation, deleting the search result which has been placed into the current to-be-filled slot from the queue at which the search result is located includes: deleting the search result which has been placed into the current to-be-filled slot from the organic search result queue and/or the push information search queue.

If a search result with the highest first evaluation score in the organic search queue is placed into the current to-be-filled slot, after the step of selecting the search result satisfying the preset condition from the organic search queue and the push information satisfying the admission condition of the current slot block in the push information search queue and placing the selected search result into the current to-be-filled slot, deleting the search result which has been placed into the current to-be-filled slot from the queue at which the search result is located specifically includes: deleting the search result with the highest first evaluation score in the organic search queue from the organic search queue if the search result with the highest first evaluation score synchronously exists in the push information search queue, deleting the search result with the highest first evaluation score from the push information search queue. If a search result with the second highest evaluation score in the push information search queue is placed into the current to-be-filled slot, after the step of selecting the search result satisfying the preset condition from the organic search queue and the push information satisfying the admission condition of the current slot block in the push information search queue and placing the selected search result into the current to-be-filled slot, deleting the search result which has been placed into the current to-be-filled slot from the queue at which the search result is located specifically includes: deleting the push information with the highest second evaluation score in the push information search queue from the push information search queue. If the organic search queue includes search results in the push information search queue, deleting the search result which has been placed into the current to-be-filled slot from the queue at which the search result is located specifically includes: deleting the push information with the highest second evaluation score in the push information search queue from the push information search queue and the organic search queue at the same time.

After the search result which has been placed into the current to-be-filled slot is deleted from the queue at which the search result is located, next time when a search result with the highest first evaluation score selected from the organic search queue or push information with the highest second evaluation score selected from the push information search queue compete against each other for a next to-be-filled slot, a case that the search result is repeatedly placed may be avoided, thereby ensuring the accuracy of the search results and improving the user experience at the same time.

Figure 4:
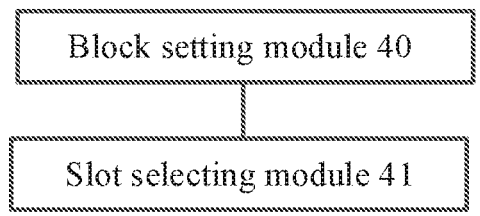
FIG. 4 is a schematic diagram illustrating a structure of an apparatus for pushing information according to an example of the present disclosure.

Correspondingly, the present disclosure further provides an apparatus for pushing information based on search content, as shown in FIG. 4, which includes a block setting module 40, a slot selecting module 41 and a slot filling module 42.

The block setting module 40 is configured to divide search result display slots into a plurality of slot blocks in a front-to-back order, and preset an admission condition for each of the slot blocks.

The slot selecting module 41 is configured to determine a current to-be-filled slot in the front-to-back order of the search result display slots.

The slot filling module 42 is configured to select a search result satisfying the preset condition from an organic search queue and push information satisfying an admission condition of a current slot block in a push information search queue and place the selected search result into the current to-be-filled slot.

The current to-be-filled slot is located within the current slot block.

Figure 5:
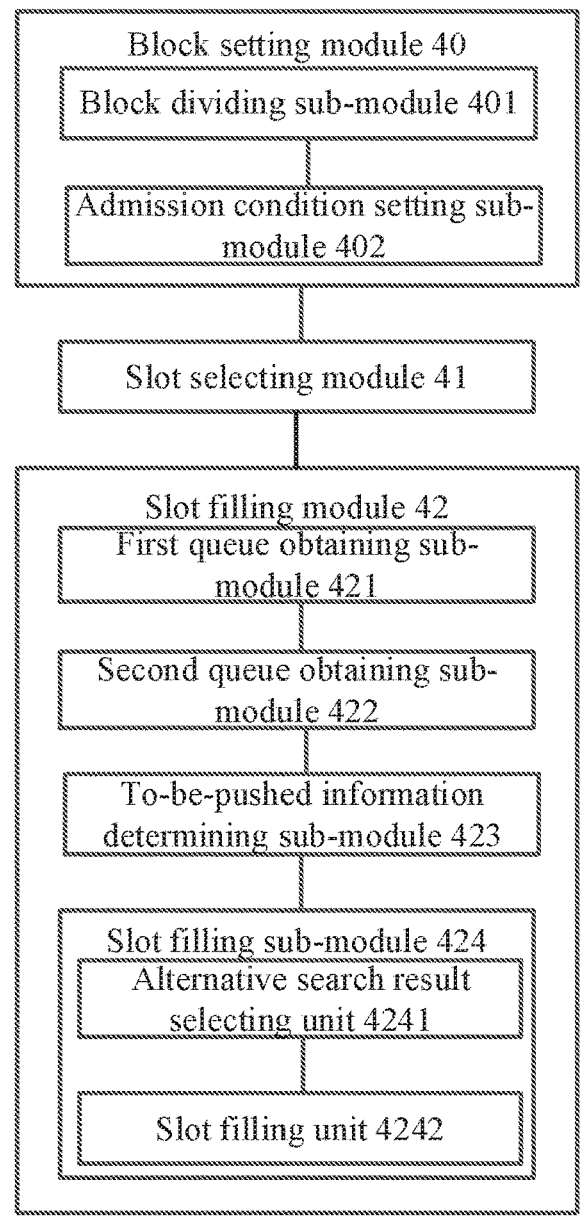
FIG. 5 is a schematic diagram illustrating a specific structure of an apparatus for pushing information according to an example of the present disclosure.

Optionally, as shown in FIG. 5, the block setting module 40 further includes:

a block dividing sub-module 401, configured to divide search result display slots into a plurality of slot blocks in a front-to-back order; and an admission condition setting sub-module 402, configured to set a strong-to-weak admission condition for the slot blocks in the front-to-back order.

The detailed description of the block setting module 40 refers to the related part of the method examples, which will not be described herein.

In a specific implementation, as shown in FIG. 5, the slot filling module 42 further includes:

a first queue obtaining sub-module 421, configured to obtain an organic search queue;

a second queue obtaining sub-module 422, configured to obtain the push information search queue consisted of search results with push attributes in organic search results;

a to-be-pushed information determining sub-module 423, configured to determine all search results satisfying the admission condition of the current slot block in the push information search queue obtained by the second queue obtaining sub-module 422 as push information satisfying the admission condition of the current slot block;

a slot filling sub-module 424, configured to select the search result satisfying the preset condition from the organic search queue and the push information satisfying the admission condition of the current slot block and place the selected search result into the current to-be-filled slot.

Optionally, the slot filling sub-module 424 further includes:

an alternative search result selecting unit 4241, configured to take a search result with the highest first evaluation score in the organic search queue as a first alternative search result and take a search result with the highest second evaluation score in the push information satisfying the admission condition of the current slot block as a second alternative search result; and a slot filling unit 4242, configured to select a search result satisfying the preset condition from the first alternative search result and the second alternative search result and place the selected search result into the current to-be-filled slot.

Figure 6:
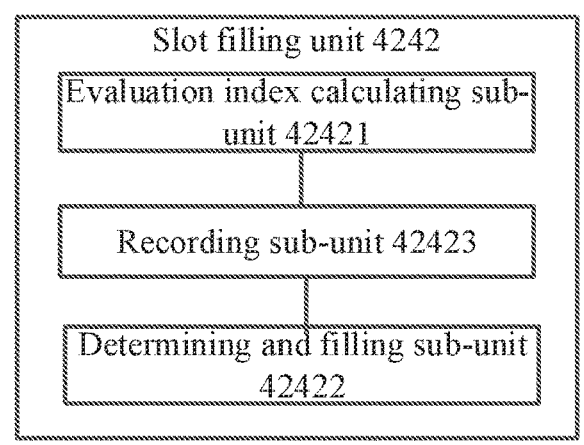
FIG. 6 is a schematic diagram illustrating a specific structure of a module in the apparatus for pushing information according to an example of the present disclosure.

Optionally, as shown in FIG. 6, the slot filling unit 4242 includes:

an evaluation index calculating sub-unit 42421, configured to pre-estimate a user value loss and a platform revenue of placing the second alternative search result into the current to-be-filled slot relative to placing the first alternative search result into the current to-be-filled slot; and a determining and filling sub-unit 42422, configured to place the first alternative search result into the current to-be-filled slot when the user value loss and the platform revenue satisfy the preset condition and place the second alternative search result into the current to-be-filled slot when the user value loss and the platform revenue do not satisfy the preset condition.

Optionally, the user value loss is a user value loss ratio, and the platform revenue is a platform revenue coefficient. The determining and filling sub-unit 42422 is specifically configured to place the first alternative search result into the current to-be-filled slot when a product of the user value loss ratio and the platform revenue coefficient is less than a first threshold; and otherwise, place the second alternative search result into the current to-be-filled slot.

Optionally, the user value loss is a user value loss ratio, and the platform revenue is a platform revenue coefficient. The determining and filling sub-unit 42422 is specifically configured to pre-estimate an accumulated user value loss ratio and an accumulated platform revenue coefficient of the current slot block after placing the second alternative search result into the current to-be-filled slot relative to placing the first alternative search result into the current to-be-filled slot; when a product of the accumulated user value loss ratio and the accumulated platform revenue coefficient is less than a second threshold, place the first alternative search result into the current to-be-filled slot; and otherwise, place the second alternative search result into the current to-be-filled slot.

Optionally, the user value loss is a user value loss ratio, and the platform revenue is a platform revenue coefficient. The determining and filling sub-unit 42422 is specifically configured to pre-estimate an accumulated user value loss ratio and an accumulated platform revenue coefficient of the current slot block after placing the second alternative search result into the current to-be-filled slot relative to placing the first alternative search result into the current to-be-filled slot; when a product of the user value loss ratio and the platform revenue coefficient is less than a first threshold and a product of the accumulated user value loss ratio and the accumulated platform revenue coefficient is less than a second threshold, place the first alternative search result into the current to-be-filled slot; and otherwise, place the second alternative search result into the current to-be-filled slot.

In a specific implementation, the evaluation index calculating sub-unit 42421 is specifically configured to:

calculate the user value loss ratio of placing the second alternative search result into the current to-be-filled slot relative to placing the first alternative search result into the current to-be-filled slot according to a formula $(\text{ActionValue}_{AD} \times \text{pCTR}_{AD})/(\text{ActionValue}_{ORG} \times \text{pCTR}_{ORG})$;

calculate the platform revenue coefficient of placing the second alternative search result into the current to-be-filled slot relative to placing the first alternative search result into the current to-be-filled slot according to a formula $(\text{BidValue}_{AD} + \text{ActionValue}_{AD}) \times \text{pCTR}_{AD}/(\text{ActionValue}_{ORG}/\text{pCTR}_{ORG})$;

where, $\text{BidValue}_{AD}$ refers to a preset click value of the second alternative search result; $\text{ActionValue}_{AD}$ refers to a value generated by different actions on a landing page after a user clicks on the second alternative search result; $\text{pCTR}_{AD}$ refers to a pre-estimated click-through rate of placing the second alternative search result placed into the current to-be-filled slot; $\text{ActionValue}_{ORG}$ refers to a value generated by different actions on a landing page after a user clicks on the first alternative search result; $\text{pCTR}_{ORG}$ refers to a pre-estimated click-through rate of placing the first alternative search result placed into the current to-be-filled slot.

Optionally, as shown in FIG. 6, the slot filling unit 4242 also includes:

a recording sub-unit 42423, configured to record a user value loss ratio and a platform revenue coefficient corresponding to the current to-be-filled slot.

The determining and filling sub-unit 42422 is specifically configured to:

obtain a user value loss ratio and a platform revenue coefficient corresponding to all slots up to the current to-be-filled slot in the current slot block respectively; and obtain the accumulated user value loss ratio of the current slot block by accumulating the user value loss ratio corresponding to all of the slots up to the current to-be-filled slot in the current slot block respectively and obtain the accumulated platform revenue coefficient of the current slot block by accumulating the platform revenue coefficient corresponding to all of the slots up to the current to-be-filled slot in the current slot block respectively.

Optionally, the first evaluation score is used to indicate a user value, and the higher first evaluation score indicates the higher user value; the second evaluation score is used to indicate a sum of the user value and the platform revenue, and the higher second evaluation score indicates the higher sum of the user value and the platform revenue.

According to the apparatus for pushing information in the present disclosure, search result display slots are divided into a plurality of slot blocks in a front-to-back order and an admission condition for each of the slot blocks is preset; a current to-be-filled slot is determined based on the front-to-back order of the search result display slots; and a search result with a user value and a platform revenue satisfying a preset condition is selected from an organic search queue and push information satisfying the admission condition of the current slot block in a push information search queue and placed into the current to-be-filled slot, where the current to-be filled slot is located within the current slot block. In this way, the method solves the problems that push information appears in a fixed position of search results or appears in a large volume during a particular period due to the impact of the weight coefficient of commercial value, which results in that the search results and the search word are not matched in relevance, and is intuitively expressed as incorrect search results. The method provided by the present disclosure ensures the accuracy of search results and improves user experience at the same time.

Figure 7:
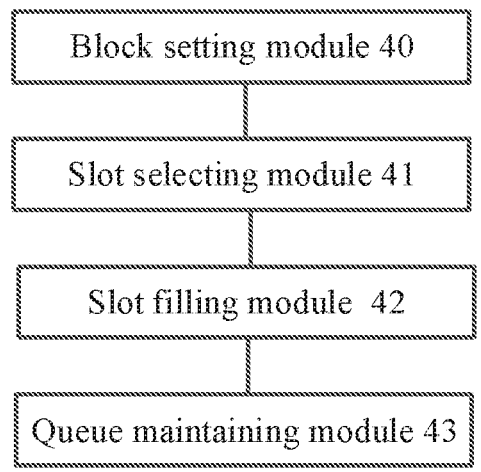
FIG. 7 is a schematic diagram illustrating a structure of an apparatus for pushing information according to another example of the present disclosure.

Optionally, as shown in FIG. 7, the apparatus for pushing information based on search content in the present disclosure further includes:

a queue maintaining module 430, configured to delete the search result which has been placed into the current to-be-filled slot from the organic search queue and/or the push information search queue.

After the search result which has been placed into the current to-be-filled slot is deleted from the queue at which the search result is located, next time when a search result with the highest first evaluation score selected from the organic search queue or push information with the highest second evaluation score selected from the push information search queue compete against each other for a next to-be-filled slot, a case that the search result is repeatedly placed may be avoided, thereby ensuring the accuracy of the search results and improving the user experience at the same time.

The present disclosure further discloses a device for pushing information based on search content. The device for pushing information includes a memory and a processor, where the memory is configured to store computer readable codes, the processor is configured to run the computer readable codes. The computer readable codes causes the device to execute the method of pushing information based on search content in the above examples when the computer readable codes are run on the device.

The device for pushing information based on search content provided in examples of the present disclosure may be a search server, and each of the above modules is hardware processing unit configured on the search server, for example, a central processor.

Each example in this specification is described in a progressive manner, each example focuses on differences from other examples, and same or similar parts among the examples may be referred to each other. Since a device example is basically similar to a method example, the description is made simply, and relevant parts may be referred to part of the description of the method examples.

Each component example of the present disclosure may be implemented by hardware, or by a software module run on one or more processors, or by a combination thereof. Those skilled in the art shall understand that all or partial functions of all or partial components in the device for pushing information based on search content according to an example of the present disclosure may be implemented by using a microprocessor or a digital signal processor (DSP) in practice. The present disclosure may also be implemented as an apparatus or an apparatus program (such as a computer program and a computer program product) for executing all or part of the method described herein. The program for implementing the present disclosure may be stored on a computer readable medium, or may be in a form of one or more signals. The signals may be downloaded from an Internet website, or provided on a carrier signal, or provided in any other form.

Figure 8:
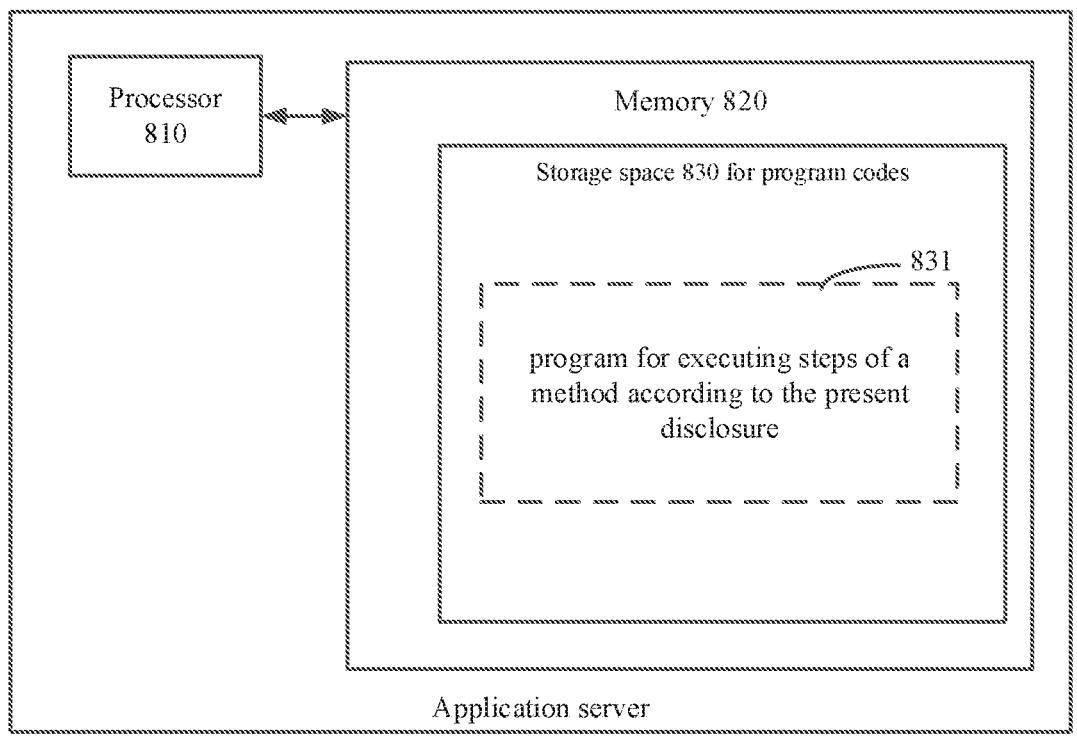
FIG. 8 is a block diagram illustrating a server for performing the method according to the present disclosure.
Figure 9:
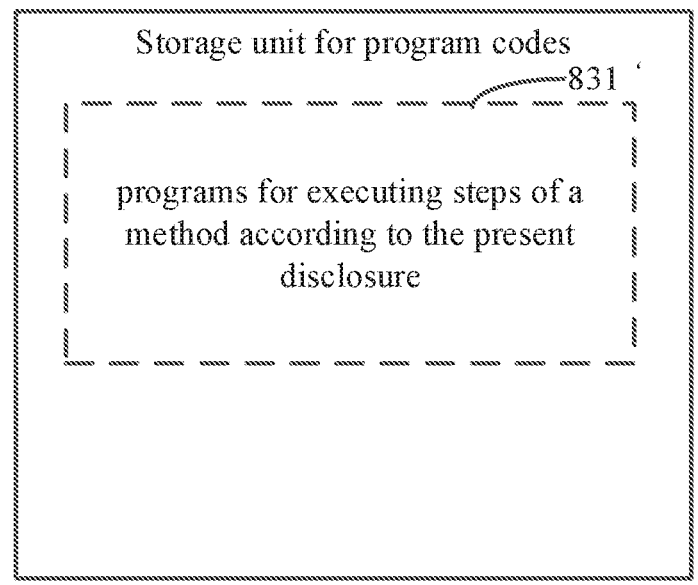
FIG. 9 is a schematic diagram illustrating a storage unit for retaining or carrying program codes to implement the method according to the present disclosure.

For example, FIG. 8 illustrates a server which can be capable of implementing an information push according to the present disclosure, for example, an application server. Traditionally, the server includes a processor 810 and a computer program product or a computer readable medium in a form of a memory 820. The memory 820 may be an electronic memory, such as a flash memory, an Electrically Erasable Programmable Read-Only Memory (EEPROM), an Erasable Programmable Read-Only Memory (EPROM), a hard disk or a Read-Only Memory (ROM). The memory 820 has a storage space 830 of program codes 831 for executing any steps in the above methods. For example, the storage space 830 of program codes may include each program code 831 for implementing each step in the above method. These program codes may be read from one or more computer program products or written into the one or more computer program products. These computer program products include a program code carrier such as a hard disk, a compact disk (CD), a memory card or a floppy disk. The computer program product is usually a portable or a fixed storage unit as shown in FIG. 9. The storage unit may have a storage section, a storage space, or the like arranged similarly to the memory 820 in the server of FIG. 8. For example, the program codes may be compressed in an appropriate form. Generally, the storage unit includes computer readable codes 831', for example, codes read by the processor 810 and the like. When being run by the server, these codes cause the server to execute each step in the method described above.

"One example", "examples" or "one or more examples" described herein indicate that specific characteristics, structures or properties described in combination with examples are included in at least one example of the present disclosure. Further, it is to be noted that the phrase "in an example" herein does not necessarily refer to the same example.

Many specific details are described in the specification provided herein. However, it is to be understood that the examples of the present disclosure can be implemented without these specific details. In some examples, the method, structure and technology known to the public are not described in detail so as not to obscure the understanding of the specification.

It is to be noted that the above examples are illustrative of the present disclosure but do not limit the present disclosure, and those skilled in the art may design substitute examples without departing from the scope of the appended claims. In the claims, any reference symbol between brackets shall not be construed as a limitation to the claims. The word "including" does not exclude the presence of elements or steps that are not listed in the claims. The word "one" or "a" located before an element does not exclude the presence of a plurality of such elements. The present disclosure may be implemented by means of hardware including several different elements and by means of an appropriately programmed computer. In the claims enumerating a plurality of the apparatuses, some in these apparatuses may be specifically implemented by a same hardware item. The use of words such as first, second, and third does not indicate any order, and these words may be interpreted as names.

Further, it is to be noted that the language used in the specification is mainly selected for readability and teaching purpose, rather than explaining or limiting the theme of the present disclosure. Therefore, it is apparent that those of ordinary skill in the art may make many modifications and changes without departing from the scope and spirit of the appended claims. For the scope of the present disclosure, the description is illustrative but does not limit the present disclosure, and the scope of the present disclosure is defined by the appended claims.

The invention claimed is:

1. A method of pushing information based on search content, comprising:
    dividing search result display slots into a plurality of slot blocks in a front-to-back order;
    presetting an admission condition for each of the slot blocks, wherein the presetting of the admission condition for each of the slot blocks comprises:
        setting a strong-to-weak admission condition for the slot blocks in the front-to-back order; and
        for each of the slot blocks, the admission condition for a slot block is determined by:
            obtaining historical data of search results placed within the slot block;
            calculating, according to the historical data, a value of each of one or more admission parameters when the search results are placed into the slot block, wherein the one or more admission parameters include one or more of average relevance, an average click-through rate or an average conversion rate;
            for each of the one or more admission parameters, setting the value of an admission parameter as an admission parameter threshold of the slot block; and
            in response to determining that for each of the one or more admission parameters, a pre-estimated value of the admission parameter of push information is greater than the corresponding admission parameter threshold, allowing the push information to be placed into the slot block;
    determining a current to-be-filled slot based on the front-to-back order of the search result display slots;
    selecting a search result satisfying a preset condition from push information satisfying the admission condition of a current slot block including the current to-be-filled slot and an organic search queue;
    placing the selected search result into the current to-be-filled slot;
    wherein the selecting of the search result satisfying the preset condition from the organic search queue and the push information satisfying the admission condition of the current slot block, and the placing of the selected search result into the current to-be-filled slot comprise:
        obtaining the organic search queue including organic search results;
        obtaining a push information search queue comprised of search results with push attributes in the organic search results;
        determining all search results satisfying the admission condition of the current slot block in the push information search queue as the push information satisfying the admission condition of the current slot block;
        deleting the search results with push attributes in the organic search results from the organic search queue to obtain an updated organic search queue;
        selecting the search result satisfying the preset condition from the push information satisfying the admission condition of the current slot block and the updated organic search queue; and
        placing the selected search result into the current to-be-filled slot.

2. The method according to claim 1, wherein the selecting the search result satisfying the preset condition from the organic search queue and the push information satisfying the admission condition of the current slot block and placing the selected search result into the current to-be-filled slot further comprise:
    taking a search result with the highest first evaluation score in the organic search queue as a first alternative search result;
    taking a search result with the highest second evaluation score in the push information satisfying the admission condition of the current slot block as a second alternative search result;
    selecting the search result satisfying the preset condition from the first alternative search result and the second alternative search result; and
    placing the selected search result into the current to-be-filled slot.

3. The method according to claim 2, wherein the selecting the search result satisfying the preset condition from the first alternative search result and the second alternative search result and placing the selected search result into the current to-be-filled slot comprise:
    pre-estimating a user value loss and a platform revenue of placing the second alternative search result into the current to-be-filled slot relative to placing the first alternative search result into the current to-be-filled slot;
    when the user value loss and the platform revenue satisfy the preset condition, placing the first alternative search result into the current to-be-filled slot; and
    when the user value loss and the platform revenue do not satisfy the preset condition, placing the second alternative search result into the current to-be-filled slot.

4. The method according to claim 3, wherein the user value loss is a user value loss ratio, the platform revenue is a platform revenue coefficient, and the placing the first alternative search result into the current to-be-filled slot when the user value loss and the platform revenue satisfy the preset condition and placing the second alternative search result into the current to-be-filled slot when the user value loss and the platform revenue do not satisfy the preset condition comprise:
    when a product of the user value loss ratio and the platform revenue coefficient is less than a first threshold, placing the first alternative search result into the current to-be-filled slot; and
    when the product of the user value loss ratio and the platform revenue coefficient is equal to or greater than the first threshold, placing the second alternative search result into the current to-be-filled slot.

5. The method according to claim 3, wherein pre-estimating the user value loss and the platform revenue of placing the second alternative search result into the current to-be-filled slot relative to placing the first alternative search result into the current to-be-filled slot comprises:
   obtaining a user value loss ratio and a platform revenue coefficient corresponding to all slots up to the current to-be-filled slot in the current slot block respectively;
   obtaining an accumulated user value loss ratio of the current slot block by accumulating the user value loss ratio corresponding to all of the slots up to the current to-be-filled slot in the current slot block respectively; and
   obtaining an accumulated platform revenue coefficient of the current slot block by accumulating the platform revenue coefficient corresponding to all of the slots up to the current to-be-filled slot in the current slot block respectively.

6. The method according to claim 5, wherein the placing the first alternative search result into the current to-be-filled slot when the user value loss and the platform revenue satisfy the preset condition and placing the second alternative search result into the current to-be-filled slot when the user value loss and the platform revenue do not satisfy the preset condition comprise:
   when a product of the accumulated user value loss ratio and the accumulated platform revenue coefficient is less than a second threshold, placing the first alternative search result into the current to-be-filled slot; and
   when the product of the accumulated user value loss ratio and the accumulated platform revenue coefficient is equal to or greater than the second threshold, placing the second alternative search result into the current to-be-filled slot.

7. The method according to claim 5, wherein the placing the first alternative search result into the current to-be-filled slot when the user value loss and the platform revenue satisfy the preset condition and placing the second alternative search result into the current to-be-filled slot when the user value loss and the platform revenue do not satisfy the preset condition comprise:
   when a product of a user value loss ratio and a platform revenue coefficient is less than a first threshold, and a product of the accumulated user value loss ratio and the accumulated platform revenue coefficient is less than a second threshold, placing the first alternative search result into the current to-be-filled slot; and
   otherwise, placing the second alternative search result into the current to-be-filled slot.

8. The method according to claim 3, wherein the user value loss is a user value loss ratio, the platform revenue is a platform revenue coefficient, and the method further comprises:
   calculating the user value loss ratio of placing the second alternative search result into the current to-be-filled slot relative to placing the first alternative search result into the current to-be-filled slot according to a formula $(\text{ActionValue}_{AD} \times \text{pCTR}_{AD})/(\text{ActionValue}_{ORG} \times \text{pCTR}_{ORG})$; and
   calculating the platform revenue coefficient of placing the second alternative search result into the current to-be-filled slot relative to placing the first alternative search result into the current to-be-filled slot according to a formula $(\text{BidValue}_{AD} + \text{ActionValue}_{AD}) \times \text{pCTR}_{AD}/(\text{ActionValue}_{ORG} \times \text{pCTR}_{ORG})$;

wherein $\text{BidValue}_{AD}$ refers to a preset click value of the second alternative search result; $\text{ActionValue}_{AD}$ refers to a value generated by different actions on a landing page after a user clicks on the second alternative search result; $\text{pCTR}_{AD}$ refers to a pre-estimated click-through rate of placing the second alternative search result into the current to-be-filled slot; $\text{ActionValue}_{ORG}$ refers to a value generated by different actions on a landing page after the user clicks on the first alternative search result; $\text{pCTR}_{ORG}$ refers to a pre-estimated click-through rate of placing the first alternative search result into the current to-be-filled slot.

9. The method according to claim 2, wherein the first evaluation score is used to indicate a user value, and the higher first evaluation score indicates the higher user value;
   the second evaluation score is used to indicate a sum of the user value and a platform revenue, and the higher second evaluation score indicates the higher sum of the user value and the platform revenue.

10. The method according to claim 1, wherein after the selecting the search result satisfying the preset condition from the organic search queue and the push information satisfying the admission condition of the current slot block in the push information search queue and placing the selected search result into the current to-be-filled slot, the method further comprises:
    deleting the search result which has been placed into the current to-be-filled slot from the organic search queue and/or the push information search queue.

11. A device for pushing information based on search content, comprising:
    a memory, configured to store computer readable codes; and
    a processor, configured to run the computer readable codes,
    when the computer readable codes are run on the device, the device is caused to execute a method of pushing information based on search content, the method comprising:
    dividing search result display slots into a plurality of slot blocks in a front-to-back order;
    presetting an admission condition for each of the slot blocks, wherein the presetting of the admission condition for each of the slot blocks comprises:
       setting a strong-to-weak admission condition for the slot blocks in the front-to-back order; and
       for each of the slot blocks, the admission condition for a slot block is determined by:
          obtaining historical data of search results placed within the slot block;
          calculating, according to the historical data, a value of each of one or more admission parameters when the search results are placed into the slot block, wherein the one or more admission parameters include one or more of average relevance, an average click-through rate or an average conversion rate;
          for each of the one or more admission parameters, setting the value of an admission parameter as an admission parameter threshold of the slot block; and
          in response to determining that for each of the one or more admission parameters, a pre-estimated value of the admission parameter of push information is greater than the corresponding admission parameter threshold, allowing the push information to be placed into the slot block;

determining a current to-be-filled slot based on the front-to-back order of the search result display slots;
selecting a search result satisfying a preset condition from push information satisfying the admission condition of a current slot block including the current to-be-filled slot and an organic search queue;
placing the selected search result into the current to-be-filled slot;
wherein the selecting of the search result satisfying the preset condition from the organic search queue and the push information satisfying the admission condition of the current slot block, and the placing of the selected search result into the current to-be-filled slot comprise:
obtaining the organic search queue including organic search results;
obtaining a push information search queue comprised of search results with push attributes in the organic search results;
determining all search results satisfying the admission condition of the current slot block in the push information search queue as the push information satisfying the admission condition of the current slot block;
deleting the search results with push attributes in the organic search results from the organic search queue to obtain an updated organic search queue;
selecting the search result satisfying the preset condition from the push information satisfying the admission condition of the current slot block and the updated organic search queue; and
placing the selected search result into the current to-be-filled slot.

12. A non-transitory readable medium storing computer readable codes, which are invoked and executed by a processor to execute a method of pushing information based on search content, the method comprising:
dividing search result display slots into a plurality of slot blocks in a front-to-back order;
presetting an admission condition for each of the slot blocks, wherein the presetting of the admission condition for each of the slot blocks comprises:
setting a strong-to-weak admission condition for the slot blocks in the front-to-back order; and
for each of the slot blocks, the admission condition for a slot block is determined by:
obtaining historical data of search results placed within the slot block;
calculating, according to the historical data, a value of each of one or more admission parameters when the search results are placed into the slot block, wherein the one or more admission parameters include one or more of average relevance, an average click-through rate or an average conversion rate;
for each of the one or more admission parameters, setting the value of an admission parameter as an admission parameter threshold of the slot block; and
in response to determining that for each of the one or more admission parameters, a pre-estimated value of the admission parameter of push information is greater than the corresponding admission parameter threshold, allowing the push information to be placed into the slot block;
determining a current to-be-filled slot based on the front-to-back order of the search result display slots;
selecting a search result satisfying a preset condition from push information satisfying the admission condition of a current slot block including the current to-be-filled slot and an organic search queue;
placing the selected search result into the current to-be-filled slot;
wherein the selecting of the search result satisfying the preset condition from the organic search queue and the push information satisfying the admission condition of the current slot block, and the placing of the selected search result into the current to-be-filled slot comprise:
obtaining the organic search queue including organic search results;
obtaining a push information search queue comprised of search results with push attributes in the organic search results;
determining all search results satisfying the admission condition of the current slot block in the push information search queue as the push information satisfying the admission condition of the current slot block;
deleting the search results with push attributes in the organic search results from the organic search queue to obtain an updated organic search queue;
selecting the search result satisfying the preset condition from the push information satisfying the admission condition of the current slot block and the updated organic search queue; and
placing the selected search result into the current to-be-filled slot.

* * * * *